US006724602B2

(12) United States Patent
Giannopoulos

(10) Patent No.: US 6,724,602 B2
(45) Date of Patent: Apr. 20, 2004

(54) PANIC PROTECTION FROM FAULT CONDITIONS IN POWER CONVERTERS

(75) Inventor: Demetri Giannopoulos, Norwalk, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 398 days.

(21) Appl. No.: 09/817,970

(22) Filed: Mar. 27, 2001

(65) Prior Publication Data

US 2002/0141128 A1 Oct. 3, 2002

(51) Int. Cl.[7] .................................................. H02H 3/22
(52) U.S. Cl. ......................... 361/111; 361/88; 361/93.1
(58) Field of Search ............................ 361/111, 78, 88, 361/93.1, 115, 117; 315/225, 308, 307, 291

(56) References Cited

U.S. PATENT DOCUMENTS 5,696,431 A 12/1997 Giannopoulos et al. ..... 315/308
5,883,473 A 3/1999 Li et al. ..................... 315/225
5,925,990 A * 7/1999 Crouse et al. .............. 315/307
5,978,195 A * 11/1999 Goder et al. .................. 361/94

OTHER PUBLICATIONS

Patent Abstracts of Japan; vol. 018, No. 063, (E–1500), Feb. 2, 1994, JP05283183A.

* cited by examiner

*Primary Examiner*—Stephen W. Jackson
*Assistant Examiner*—James A Demakis
(74) *Attorney, Agent, or Firm*—Dicran Halajian

(57) ABSTRACT

A method and apparatus for fault condition protection for a lighting control circuit is presented. The method consists of a hybrid software and hardware solution to take advantage of the useful attributes of both. In the event of a fault condition being detected the software set driving signals to the light are rapidly blocked via hardware. In the event the fault condition persists, software modifies the driving signals to the light.

18 Claims, 2 Drawing Sheets

G1, G2 waveforms in presence of panic fault condition.

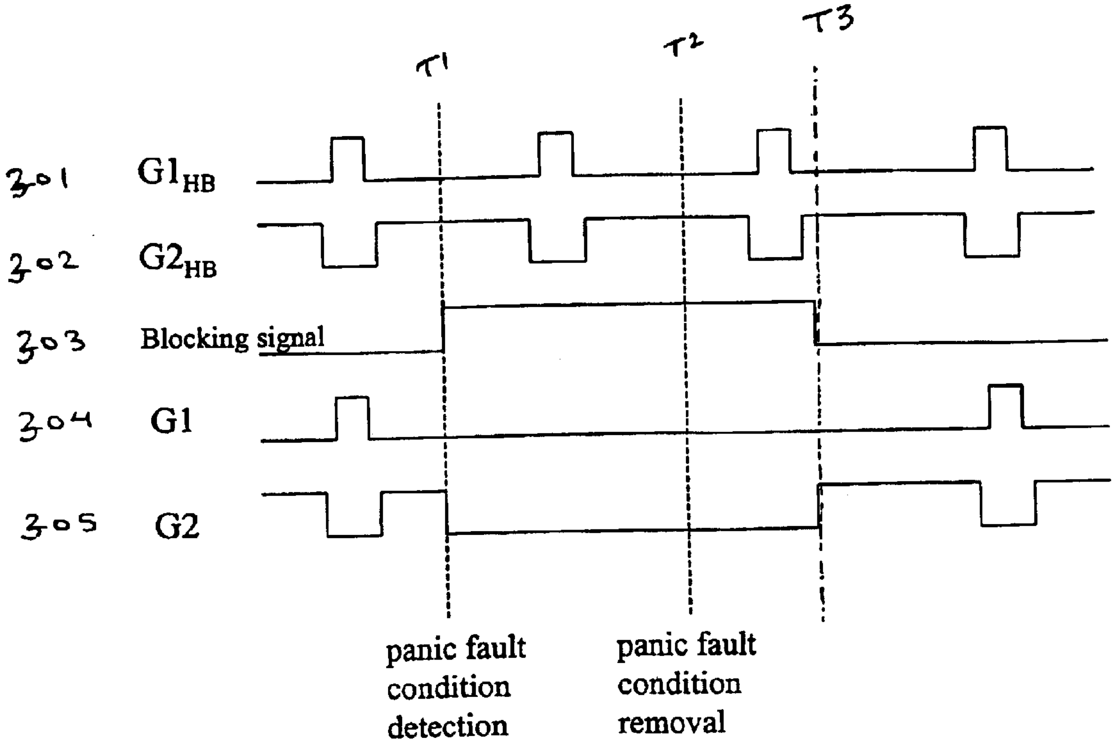
Figure 3: G1, G2 waveforms in presence of panic fault condition.

PANIC PROTECTION FROM FAULT CONDITIONS IN POWER CONVERTERS

TECHNICAL FIELD

This invention relates generally to a method and apparatus for providing panic protection for a circuit and its load. This invention has particular application in the protection of power converter circuits used to control electric lamps.

BACKGROUND OF THE INVENTION

Florescent and High Intensity Discharge (HID) lamps are commonly controlled by an electronic ballast. The ballast drives the lamp with an alternating wave of a particular frequency. The reason this is done is that due to the physics of such lamps, current cannot pass in one single direction continually without adversely effecting the operation of, or damaging, the lamp. As well, due to the physics and composition of the electronic ballast which drives the lamp, there are inherent limits as to the voltage which can exist across, and the current which can flow through, the ballast and the lamp. Voltages in excess of the maximum rated voltage for the lamp, as well as currents in excess of the maximum rated current for the lamp, will damage the lamp. These ratings vary with the type and robustness of the lamp in question. Additionally, and more of a risk factor, is the ballast itself. Ballasts commonly contain a resonant capacitance in parallel with the lamp. If an over-voltage condition across a lamp occurs, i.e., the lamp voltage exceeds the ignition voltage plus a margin, this resonant capacitance will be destroyed. Accordingly, protections for an over-voltage or an over-current situation are very important in the design of lighting systems. Such situations are known as fault conditions. As well, panic protection (i.e., protecting against a transient surge with extremely fast onset) and the related ability of the lamp driving circuit to automatically shut itself off, or dramatically decrease the voltage across the lamp, and the current running through it, is necessary. The existence of protections such as these in the ballast system can potentially save the lamp and ballast, as well as peripheral equipment.

On the other hand, some apparently fault or panic conditions are merely noise, and are so transient so as to present no reason to modify the AC waveform sent to, or the power it delivers to, the lamp. That is, there is no enduring organic problem with either the circuit, or the lamp load driven by the circuit, or any associated components or elements, to mandate changing the driving signals of the lamp, and thus visibly diminishing the performance of the lamp.

There are a variety of methods to sense a fault condition. Sometimes, electronic ballast overload protection is effected using analog comparators, where an overload protection circuit comprising analog comparators is hardwired to the lamp, and designed to continually sense the lamp voltage and the lamp current. If the value of the voltage or current is larger than a reference value built into the comparator, the comparator will output a signal to shut down the switching pulse generated by the ballast and the lamp will not be driven. Many ballasts are microprocessor based. These microprocessor-based ballasts may also use analog comparators to detect the lamp voltage or the lamp current and shut down the switching signal when there is an overage. Alternatively, the output of the analog comparator can be sent to the central processing unit (CPU) of the microprocessor driving the lamp with a pulse width modulated (PWM) signal. The comparator output will activate a software program that will change the PWM module's settings to either shut down the switching pulse, change the frequency, or reduce the pulse switch so as to insure the power delivered to the lamp will be low enough to resolve the fault condition.

A recent proposal, disclosed in U.S. Pat. No. 5,696,431, commonly assigned with the instant application, which is incorporated herein by reference. This patent discloses, upon sensing of an overload condition, immediately increasing the switching frequency to its maximum setting (and thus the switching period to its minimum) for the duration of the fault condition.

Another, similar, solution is disclosed in a commonly assigned pending U.S. patent application of Shenghong Wang, entitled "METHOD AND APPARATUS FOR PROVIDING OVERLOAD PROTECTION FOR A CIRCUIT", also incorporated herein by reference. In this latter application, in describing an exemplary fixed-frequency, pulse-width-controlled system, dedicated digital hardware is employed to set the pulse width to a minimum value upon the sensing of an overload condition. Software is programmed to return to the normal mode of operation many switching cycles later.

There are problems inherent in the methods currently used to provide overload protection for an electronic ballast. What will first be discussed is the pure hardware solution using analog comparators. The use of analog comparators for ballast failure protection is both unstable and unreliable. In the first instance, the parameters of the protection circuit are sensitive to variations in temperature and process technology, and are therefore plagued by substantial variability from the nominal values of maximum current and maximum voltage that they protect against. Additionally, even assuming that the reference voltages and reference currents in the comparators can be suitably or acceptably calibrated for the circuit in which they are used, the resulting protection circuit would not be programmable or of much use in any other circuit. Accordingly, in the analog pure-hardware protection circuit, it would only be useful for protecting against one particular voltage and one particular current limit. Such a protection circuit would neither be universal or adjustable in any sense and could not be used as a standard component of a ballast designed to control a variety of lamps and lamp driving circuits.

On the other hand, using a pure software solution does gain the advantage of flexibility, in that the maximum current and maximum voltage against which the protection circuit protects can be programmable. Thus the circuit can be used with a variety of lamps and lamp driving circuits, as well as offering flexibility to change the overload maxima as noise and other conditions may warrant. All that is needed is to reprogram the CPU to change the PWM signal upon a particular condition (e.g., maximum voltage) occurring for example, if the override circuit trips at too low a voltage, then values utilized by the software can simply be changed. The hardware solution would require various component changes.

The speed with which the overage decision-making process can be made in the pure-software solution is generally too slow to protect circuits from a panic or near panic situation. A panic situation is one where there is a severe current overage or a severe voltage overage running in the lamp and the protection circuit must respond immediately if the damage to the ballast is to be prevented. Immediately in such a sense means within one switching cycle of the lamp. The CPU and software simply take too long to respond.

Finally, even in those systems using a digital hardware solution, the performance of the lamp is diminished for the duration of the response to the fault condition. Thus, in all instances, the driving signal to the circuit load, which in a lighting circuit is a lamp, is shut down or modified in response to each and every sensed fault condition. This is superfluous, and a needless interruption of service. In each of the prior art solutions, it takes several switching cycles to return to the normal mode of operation. However, many fault conditions are not "real", in the sense that they indicate an enduring problem with the circuit or the driven load. These fault conditions can be the result of noise, or some other cause unconnected to the circuit or its components and associated devices. Such fault conditions tend to be of very short duration, and often resolve themselves. In effect, reacting to each and every sensed fault condition with the full battery of system remedies is akin to administering a complex treatment to every patient registering a false positive on a somewhat insensitive medical test.

In general, providing overload protection via analog hard wiring is inaccurate and inflexible. Providing the protection in the CPU software means that any overload condition has to be processed through the CPU, because an adjustment must be made, and a new PWM signal generated. This takes too long. Providing it via dedicated hardware has additional costs and complexity, and the modified pulse train to the lamp is. In any case, a fault condition of any cause or duration triggers the fault response and affects performance. Where such fault condition is only transient or temporary, and is not indicative of any enduring and potentially dangerous problem, there is no reason to modify the performance of the lamp, and thus decrease the service provided by the lighting system.

As a result of the foregoing discussion, clearly a significant need exists in the art for an overload protection circuit for an electric lamp and ballast which can provide both the programmable flexibility of a software solution with the immediacy and speed that can only be currently delivered by a hardwired overload protection circuit. There is further a need to distinguish transient fault conditions from enduring ones that mandate modifying the waveform delivered to the load. Such distinction would protect the circuit and its components, yet at the same time not needlessly modify the driving signal to the load until it can be determined that the fault condition is in fact real.

SUMMARY OF THE INVENTION

The above-described shortfalls of the prior art are overcome in accordance with the teachings of the present invention which relates to an apparatus and method for providing overload protection for a circuit by means of a hybrid software and hardware solution. In a preferred embodiment, this circuit is used in a digital ballast controlling electric lighting using a half-bridge power converter, such as is commonly used in the control and operation of gas discharge lamps. The invention can easily be expanded to other power conversion circuits driving a wide variety of loads.

In a preferred embodiment, upon the sensing of a fault condition the circuit reacts immediately to temporarily block all driving signals from reaching the load. At the same time, the signals themselves remain intact, and are neither modified nor terminated until it can be confirmed that the fault is a "real" one.

Effectively, the driving pulse trains are overridden, or blocked, via hardware logic gates during initial sensing of overload conditions for a user defined short time interval. If such conditions persist beyond a user defined number of such blockings, the pulse trains can then be modified, attenuated, or terminated, as defined and set by the user, via software.

BRIEF DESCRIPTION OF THE DRAWINGS

FIG. 3 depicts an exemplary blocking signal and the internal and external driving voltages according to the method of the present invention.

DETAILED DESCRIPTION OF THE PREFERRED EMBODIMENT

For purposes of explanation we refer herein to high voltage, high-frequency switches. These switches are well known in the art for driving gas discharge lamps. They operate by means of generating an alternating current waveform that is used to drive the lamp during steady state operation. The actual driving pulse in these ballasts, whose duty cycle and frequency affect the intensity or luminance of the lamp, is generated by either a single pulse generator, a half-bridge, power converter, or a full bridge power converter circuit.

Figure 1:
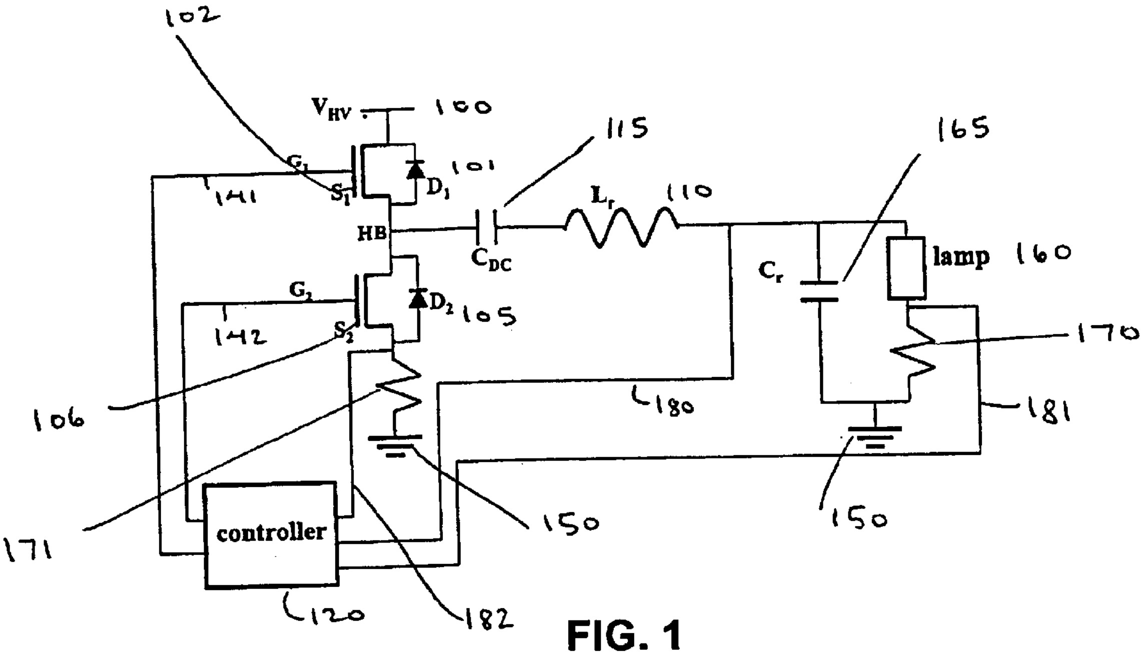
FIG. 1 shows an exemplary DC/AC power converter commonly in use.

In the latter two cases (and theoretically, there could be circuits with an arbitrary number of pulse generators in them), the multiple pulses are out of phase relative to each other and are combined to generate the lamp driving pulse. Such circuits are generally known in the art. A state of the art digital ballast driving circuit is depicted in FIG. 1. The method and apparatus of a preferred embodiment of the invention will be described with reference to this circuit. However, it is understood that the method and apparatus of the invention will generally be applicable to a large class of circuits, both currently known, and those as yet to be developed.

With reference to FIG. 1, there is shown a half-bridge power conversion circuit. The circuit consists of two switches connected in series. In this case, the switches are implemented by means of MOS transistors, although it is appreciated that numerous transistor types or other devices could be used for the switching function. MOS transistors S1 102 and S2 106 are connected in series between the $V_{HV}$ high voltage 100, and ground 150. There is additionally connected in series with the transistors a resistor 171. Across, the drain to source path of each of the transistors S1 102 and S2 106 are connected diodes D1 101 and D2 105, respectively. The diodes are connected so as to conduct in the direction opposite to the normal current path from drain to source of the transistors. The junction between the series connection of the two transistors S1 101 and S2 106 is a point labeled HB in FIG. 1 and represents the output of the inverter. The output is fed through a capacitor $C_{DC}$ 115 whose function is to block DC voltages, thus filtering out any DC offset. The circuit path then goes to an inductor $L_r$ 110 and from there to the gas discharge lamp 160, itself connected in series with a resistor 170. The lamp-resistor series connection, in parallel with a capacitor C 165, converge at ground 150, thus completing the circuit.

The controller 120 has two outputs to and three inputs from the circuit. The outputs G1 141 and G2 142 are the driving signals for each of the two MOS transistors. As well, the controller senses the current through the switches via feedback signal 182. The controller also senses the voltage delivered to the lamp via feedback signal 180, and also senses the current through the lamp via feedback signal 181. Thus, the controller is in a position to maintain or alter its output signals G1 102 and G2 106 in response to the conditions it senses from the feedback signals.

Figure 2:
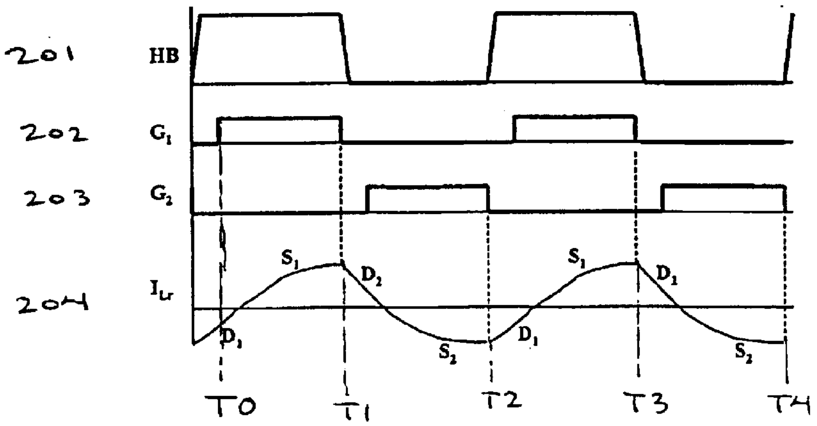
FIG. 2 depicts the driving voltages, output voltage, and inductor current for the exemplary circuit of FIG. 1.

With reference to FIG. 2, the driving signals supplied by the controller to the switches S1 102 and S2 106 as well as the output voltages and current from the circuit going to the lamp will be next described. Inasmuch as FIG. 1 depicts a DC to AC half-bridge power conversion circuit, the driving signals supplied by the controller to the switches are DC pulses G1 202 and G2 203 (with reference to FIG. 2). The same signals are depicted as G1 141 and G2 142 in FIG. 1. These pulses are applied to the gates of the MOS transistors S1 102 and S2 106 depicted in FIG. 1. These DC signals G1 202 and G2 203, with reference to FIG. 2, are applied alternately to the two switches, such that no switch is ever conductive when the other one is. In fact, to prevent cross conduction, as is shown in FIG. 2, the driving signal to the first switch G1 202 goes off and there is a pause between the time that G1 202 goes off and G2 203 goes on. As can be seen, the driving signal G1 202 goes off at a time T1 and at some time interval later G2 203 goes high. When G2 goes low (i.e., switch S2 is non-conductive) at a time T2, there is an additional pause prior to signal G1 202 going high again and making switch S1 conductive. By means of this alternate driving of the two switches S1 and S2, (102 and 106, respectively, with reference to FIG. 1), and the pause intervals between their respective activation, cross-conduction, which would permanently damage the switches, is prevented.

Continuing with reference to FIG. 2, signal 201 is the output voltage of the inverter, identified as point HB in FIG. 1. As can be seen, the signal is an approximate pulse train, where the transitions from high to low, and low to high, are not an absolutely steep wall, but a smooth continuous transition of relatively high slope. The amplitude of the HB signal varies between $V_{HB}$ ground. Additionally depicted as 204 is the current through the inductor $L_r$ (110 in FIG. 1) at the bottom of FIG. 2. Beginning at time T0, the top switch S1 102 is driven conductive by means of signal G1 202 going high. With G1 202 high, switch S1 102 (FIG. 1) conducts, and current flows between the line voltage $V_{HB}$ through the output point HB, to the lamp 160.

Thus, the current through the inductor $I_{Lr}$ 204 (FIG. 2) indicates that with signal G1 202 high, switch S1 conducts positive current. When driving signal G1 202 goes low, and driving signal G2 203 has not yet gone high, because the inductor cannot instantaneously stop the current flowing through it, current continues to flow through the inductor. This current is supplied via D2 (105 in FIG. 1), the diode connected across switch S2. The current in this phase of its cycle varies from its high peak at time T1 to zero. Before the current through the inductor $I_{Lr}$ 204 crosses zero switch S2 is enabled by signal G2 203 going high and current flows in the opposite direction (counterclockwise for positive current) through switch S2, as is shown in FIG. 2. This continues until the current reaches its maximum negative value, at time T2, when the driving signal to transistor S2, namely signal G2 203, goes low and the pause interval commences. At this time, again due to the properties of the inductor $L_r$, current cannot instantaneously cease to flow through the inductor, so in the absence of either switch being on, the only available conductive path is through D1 (101 in FIG. 1). It should be noted that the current flows through D1 back into the voltage source $V_{HB}$ 100 (FIG. 1). As the current flows through D1, it decreases to zero. As the inductor current $I_{Lr}$ 204 once again approaches zero, coming from the negative direction, the first switch's driving signal G1 202 again goes high sending the current from zero to its peak value at time T3, where the conductive path is from $V_{HB}$ 100 (with reference to FIG. 1), through S1 102 to the inductor $L_r$ 110 and the lamp 160.

As is obvious from the preceding discussion, there are thus four phases to the current, labeled S1, D2, S2, and D1 in the inductor current plot 204.

The above described the normal operation of the circuit depicted in FIG. 1. The method and apparatus of the invention come into play when there is an abnormal condition, when normal operation of the circuit could destroy the ballast. In such a fault condition, there are various prior art ways to deal with it, as discussed above. The present invention improves upon those solutions by increasing the resolution at which the controller determines whether a fault is due to noise or some other non-serious transient condition, and need not be dealt with by any complex panic protection scheme.

What will next be described is the method and apparatus of a preferred embodiment of the invention with reference to the exemplary circuit discussed above with reference to FIGS. 1 and 2.

The basic idea behind the overload protection mechanism of the present invention is to, upon detection of an overload, immediately override the driving signals G1 and G2 by means of a blocking signal. The blocking signal is temporary, and although the blocking time interval is user defined, it is assumed to be of very short duration, so as not to perceptibly interrupt the driving of the load. The blocking signal is triggered in hardware, so the reaction time is nearly immediate.

The function of such a scheme is the discernment of the difference between a noise based, or otherwise transient, perceived fault condition, and a real problem with the ballast. If the condition is a "false alarm" and nothing is seriously wrong with the ballast and its components, when the blocking signal is released, the circuit returns to normal operation immediately. Since the driving signals of the switches have only been blocked from reaching the switches, but have not been at all altered, after the blocking signal is removed, they pass as if nothing had happened. On the other hand, if there is a serious problem with the ballast, the blocking signal with continue triggering, and after a user set plurality of blocking signal executions, the controller software will modify, attenuate, or terminate the driving signals G1 and G2. Such modification can be one, or some combination of, the various modification schemes to the pulse train as known, or may be known in the future.

With reference to FIG. 3, the above described blocking signal will be next presented. FIG. 3 depicts two versions of each of the driving signals, as well as the blocking signal. $G1_{HB}$ 301 and $G2_{HB}$ 302 represent the internal—from the perspective of the controller—switch driving signals, and G1 304 and G2 305 are the signals actually output from the controller to the switches. The difference between the two pairs, i.e. the internal "HB" signals 301 and 302, respectively, and the external signals 304 and 305, respectively, is cause by the blocking signal 303, an internal signal generated within the controller, and used to pass the internal signals 301 and 302 to, or block them from, the switches.

The blocking signal is triggered in hardware when a fault condition, such as an overvoltage or overcurrent condition in the load or the switches occurs, and lasts for a user determined short period of time, so as not to impact perceptibly the performance of the driven load. In a preferred embodiment blocking will last for one switching cycle. In FIG. 3 the blocking signal is triggered at time T1, and although the internal signals 301 and 302 have not been altered by the controller, control logic will not pass them as long as the blocking signal 303 remains high. There are numerous possible hardware mechanisms to implement this functionality. One example method is to AND the inverse of the blocking signal with each of the internal signals $G1_{HB}$ 301 and $G2_{HB}$ 302. The blocking signal in this example has been set to a time interval equal to T3–T1, and thus, since at time T2 the panic fault condition has been removed, at T3 the blocking signal 303 goes low, and the internal signals $G1_{HB}$ 301 and $G2_{HB}$ 302 are again fully passed to the switches as external signals G1 304 and G2 305. Due to the short time interval of the blocking signal, there is little, if any, perceptible effect on the performance of the load. In the case of a gas discharge lamp, the blocking of the DC driving signals for one cycle (or ever two or three when operating at the common 50–200 kHz band of frequencies) is imperceptible.

If the fault condition had not self resolved, the next cycle would trigger yet again the blocking signal. Since the blocking signal is triggered and implemented in hardware, with its immediate response capability, the fault condition can do no damage, as the blocking immediately begins again, and the system thus fully protects the ballast from destruction.

In the event that the blocking signal is repeatedly triggered so as to have been executed a user defined number of times, then the microcontroller software interprets the situation as a nontransient fault, and a software resolution is executed. Such a software solution is well known in the art, and consists of some type of modification or cessation of the driving signals $G1_{HB}$ 301 and $G2_{HB}$ 302. Such a solution could be a switching frequency increase, a pulse width decrease, or shutting down completely the ballast. Such ultimate resolution will be user defined, and can be a combination of any or all of these possibilities.

As well, numerous operating states can be defined and programmed, each with a different power level, frequency and pulse width being sent to the load, where each state can be set to trigger upon a defined number of executions of the blocking signal in the prior state. In this way the user has great flexibility in tailoring an appropriate response, and operating the lamp at some self stabilizing power level, inasmuch as the blocking signal mechanism fully protects the ballast, and can be repeatedly triggered. Because the system of the invention affords a greater time to address a confirmed nontransient fault condition (while fully protecting the ballast from destruction throughout that time via the blocking signal), the response to such a real fault condition can be programmed in, and executed by, software.

Thus, the fast reaction time of hardware can be combined with the flexibility of software implementation to increase the resolution at which a panic condition is recognized as "real" or nontransient, and maintain full protection of the ballast and its components during the recognition process.

While the foregoing describes the preferred embodiment of the invention, it will be understood by those of skill in the art that various modifications and variations may be utilized, such as, for example, using the invention in circuits that have any waveform type as driving outputs, or as precursors to them, both ac and dc, and the extension of the circuit of the preferred embodiment to any number of output signals and driven devices. Such modifications are intended to be covered by the following claims.

What is claimed:

1. A method of controlling a lighting device comprising the steps of:

supplying pulse trains during normal operation, the pulse trains having characteristics to determine the intensity of the lighting device; and causing the pulse trains to be:

blocked in response to an overload condition, and modified if said overload condition persists;

wherein said blocking is done for a defined time interval while the pulse trains continue to be supplied, and said modification is done if the overload condition persists after a defined number of blocking cycles have been executed.

2. The method of claim 1 where said blocking is done in hardware, and said modification is accomplished in software.

3. The method of claim 1 where said defined time interval is one switching cycle of the driving pulses.

4. The method of claim 1 where the modification comprises at least one of pulse width modification, frequency shift control, or shut down.

5. The method of claim 3 where the modification comprises at least one of pulse width modification, frequency shift control, or shut down.

6. The method of claim 5 where the blocking is accomplished using logic gates.

7. The method of claim 1 where the blocking is accomplished using logic gates.

8. The method of claim 4 where the blocked signals are DC voltages, and the lamp driving pulses are AC voltages.

9. Apparatus for providing fault protection to a lighting device, the apparatus comprising:

a controller which blocks the light driving signals in response to a fault condition, while the light driving signals continue to be supplied, and modifies said driving signals if said condition persists.

10. The apparatus of claim 9 further comprising hardware arranged to cause said blocking upon the detection of a fault condition.

11. The apparatus of claim 10 where said hardware comprises logic gates.

12. A circuit for controlling a lighting device comprising:

a pulse generator for generating at least one pulse train having parameters indicative of a power level at which said lighting device should operate;

at least one logic gate to block said pulse train upon hardware detection of a specified fault condition while the pulse train continues to be generated; and a microprocessor for executing software that causes said pulse generator to operate in accordance with user control to set the parameters of said pulse train if said fault condition persists.

13. The circuit of claim 12, where said blocking of said pulse train comprises blocking the driving signals to the pulse generator.

14. The circuit of claim 13, where said driving signals to the pulse generator comprise DC voltages, and the pulse generator outputs an AC voltage.

15. The circuit of claim 13 where the blocking of the pulse train is for a user defined short time interval.

16. A method of controlling a lighting device comprising the steps of:

supplying pulse trains during normal operation, the pulse trains having characteristics to determine the intensity of the lighting device; and causing the pulse trains to be:

blocked in response to an overload condition, and modified if said overload condition persists;

wherein said blocking is done in hardware, and said modification is accomplished in software, and wherein said blocking is done for one switching cycle of the driving pulses, and said modification is done if the overload condition persists after a defined number of blocking cycles have been executed.

17. The method of claim 16 where the modification comprises at least one of pulse width modification, frequency shift control, or shut down.

18. The method of claim 17 where the blocking is accomplished using logic gates.

* * * * *